(12) United States Patent
Nepomniachtchi et al.

(10) Patent No.: US 9,842,331 B2
(45) Date of Patent: Dec. 12, 2017

(54) SYSTEMS AND METHODS FOR MOBILE IMAGE CAPTURE AND PROCESSING OF CHECKS

(75) Inventors: Grisha Nepomniachtchi, San Diego, CA (US); Vitali Kliatskine, San Diego, CA (US)

(73) Assignee: MITEK SYSTEMS, INC., San Diego, CA (US)

( * ) Notice: Subject to any disclaimer, the term of this patent is extended or adjusted under 35 U.S.C. 154(b) by 0 days.

(21) Appl. No.: 13/488,349

(22) Filed: Jun. 4, 2012

(65) Prior Publication Data

US 2013/0028502 A1   Jan. 31, 2013

Related U.S. Application Data

(63) Continuation-in-part of application No. 12/906,036, filed on Oct. 15, 2010, which is a continuation-in-part
(Continued)

(51) Int. Cl.
*H04N 7/18* (2006.01)
*G06Q 20/32* (2012.01)
(Continued)

(52) U.S. Cl.
CPC ....... *G06Q 20/3276* (2013.01); *G06K 9/3275* (2013.01); *G06K 9/38* (2013.01);
(Continued)

(58) Field of Classification Search
CPC .......... G06K 9/3275; G06K 9/38; G06K 9/42; G06K 2209/01; G06Q 20/3275;
(Continued)

(56) References Cited

U.S. PATENT DOCUMENTS 5,966,473 A * 10/1999 Takahashi ............ G06K 9/2054
345/441
6,038,351 A    3/2000 Rigakos
(Continued)

FOREIGN PATENT DOCUMENTS

KR    10-2007-0115834 A    12/2007

OTHER PUBLICATIONS

International Search Report issued in related International Application No. PCT/US2011/056593 dated May 30, 2012 (3 pages).
(Continued)

*Primary Examiner* — Sean Motsinger
(74) *Attorney, Agent, or Firm* — Procopio, Cory, Hargreaves & Savitch LLP

(57) ABSTRACT

Techniques for processing an image of a check captured using a mobile device are provided. The check image is processed to determine whether the check can be deposited at a bank via a mobile deposit process. The system can identify regions of the check—such as the endorsement area—to determine if the check has been properly endorsed. The system can be implemented on a mobile device and/or a server, where the mobile device routes the check image to the server for processing. If the check cannot be deposited, a rejection is forwarded in real time to the mobile device for possible correction.

23 Claims, 7 Drawing Sheets

Related U.S. Application Data of application No. 12/778,943, filed on May 12, 2010, and a continuation-in-part of application No. 12/346,026, filed on Dec. 30, 2008, now Pat. No. 7,978,900.

(60) Provisional application No. 61/022,279, filed on Jan. 18, 2008.

(51) Int. Cl.
| | | |
|---|---|---|
| *G06Q 20/04* | (2012.01) | |
| *G06K 9/32* | (2006.01) | |
| *G06K 9/38* | (2006.01) | |
| *G06K 9/42* | (2006.01) | |
| *H04N 1/00* | (2006.01) | |
| *H04N 101/00* | (2006.01) | |

(52) U.S. Cl.
CPC .............. *G06K 9/42* (2013.01); *G06Q 20/042* (2013.01); *G06K 2209/01* (2013.01); *H04N 1/00244* (2013.01); *H04N 1/00307* (2013.01); *H04N 2101/00* (2013.01); *H04N 2201/001* (2013.01); *H04N 2201/0084* (2013.01)

(58) Field of Classification Search
CPC .............. G06Q 20/042; H04N 1/00244; H04N 1/00307; H04N 2101/00; H04N 2101/001; H04N 2101/0084
See application file for complete search history.

(56) References Cited

U.S. PATENT DOCUMENTS

| | | | |
|---|---|---|---|
| 7,426,316 B2 | 9/2008 | Vehvilainen | |
| 7,735,721 B1* | 6/2010 | Ma | G06Q 20/042 235/379 |
| 7,873,200 B1* | 1/2011 | Oakes, III | G06Q 20/042 235/379 |
| 7,876,949 B1* | 1/2011 | Oakes, III | G06Q 20/042 235/379 |
| 8,358,826 B1* | 1/2013 | Medina, III | G06Q 20/042 382/137 |
| 8,538,124 B1* | 9/2013 | Harpel | G06K 9/03 382/131 |
| 8,959,033 B1* | 2/2015 | Oakes, III | G06K 9/00161 235/379 |
| 9,058,512 B1* | 6/2015 | Medina, III | G06Q 20/02 |
| 2004/0037448 A1* | 2/2004 | Brundage | G06T 1/0021 382/100 |
| 2004/0109597 A1* | 6/2004 | Lugg | G06Q 20/042 382/137 |
| 2005/0097046 A1* | 5/2005 | Singfield | G06Q 20/042 705/42 |
| 2006/0177118 A1* | 8/2006 | Ibikunle | G06K 9/72 382/137 |
| 2007/0086643 A1* | 4/2007 | Spier | G06Q 20/04 382/137 |
| 2007/0154071 A1* | 7/2007 | Lin | G06K 9/00181 382/119 |
| 2007/0168382 A1* | 7/2007 | Tillberg | G06F 17/30253 |
| 2007/0206877 A1 | 9/2007 | Wu et al. | |
| 2007/0211964 A1* | 9/2007 | Agam | G06K 9/00161 382/305 |
| 2007/0288382 A1 | 12/2007 | Narayanan et al. | |
| 2008/0174815 A1* | 7/2008 | Komaki | G06F 17/241 358/1.15 |
| 2008/0183576 A1 | 7/2008 | Kim | |
| 2009/0185736 A1 | 7/2009 | Nepomniachtchi | |
| 2009/0185737 A1 | 7/2009 | Nepomniachtchi | |
| 2010/0102119 A1* | 4/2010 | Gustin | G06Q 20/10 235/379 |
| 2010/0114765 A1* | 5/2010 | Gustin | G06Q 20/10 705/40 |
| 2010/0114766 A1* | 5/2010 | Gustin | G06Q 20/10 705/40 |
| 2010/0114771 A1* | 5/2010 | Gustin | G06Q 20/10 705/43 |
| 2010/0114772 A1* | 5/2010 | Gustin | G06Q 20/10 705/43 |
| 2010/0200660 A1* | 8/2010 | Moed | G06K 7/14 235/470 |
| 2010/0208282 A1* | 8/2010 | Isaev | G06K 9/036 358/1.11 |
| 2011/0013822 A1* | 1/2011 | Meek | B65H 29/60 382/138 |
| 2012/0030104 A1* | 2/2012 | Huff | G06Q 20/108 705/42 |
| 2012/0070062 A1* | 3/2012 | Houle | G06K 9/00154 382/137 |
| 2012/0230577 A1* | 9/2012 | Calman | G06Q 20/042 382/138 |
| 2014/0040141 A1* | 2/2014 | Gauvin | G06Q 40/02 705/45 |

OTHER PUBLICATIONS

Office Action for related CA Patent Application No. 2,773,730, dated Aug. 21, 2017, in 4 pages.

\* cited by examiner

Check Processing

MICR-line Test

Front-as-Rear Test**

SYSTEMS AND METHODS FOR MOBILE IMAGE CAPTURE AND PROCESSING OF CHECKS

RELATED APPLICATIONS

This application is a continuation-in-part of co-pending U.S. patent application Ser. No. 12/906,036, filed on Oct. 15, 2010, which in turn claims priority as a continuation-in-part of copending U.S. patent application Ser. No. 12/778,943, filed on filed May 12, 2010, as well as a continuation in part of U.S. patent application Ser. No. 12/346,026 filed on Dec. 30, 2008, now U.S. Pat. No. 7,978,900, which in turn claims the benefit of U.S. Provisional Application No. 61/022,279, filed Jan. 18, 2008, all of which are incorporated herein by reference in their entirety as if set forth in full. This application is also related to U.S. patent application Ser. No. 12/717,080, filed on Mar. 3, 2010, now U.S. Pat. No. 7,778,457; U.S. patent application Ser. No. 12/346,071, filed on Dec. 30, 2008, now U.S. Pat. No. 7,953,268; and U.S. patent application Ser. No. 12/346,091, filed on Dec. 30, 2008, now U.S. Pat. No. 7,949,176; which are hereby incorporated by reference in their entirety as if set forth in full.

BACKGROUND

1. Technical Field

The embodiments described herein relate to processing images of documents captured using a mobile device, and more particularly to real-time detection of the content of a financial document for use in mobile banking applications.

2. Related Art

Banks and other businesses have become increasingly interested in electronic processing of check and other financial documents in order to expedite processing of these documents. Users can scan a copy of the document using a scanner or copier to create an electronic copy of the document that can be processed instead of a hardcopy original which would otherwise need to be physically sent to the recipient for processing. For example, some banks can process digital images of checks and extract check information from the image needed to process the check without requiring that the physical check be routed throughout the bank for processing. However, the type of information and the accuracy of information which can be processed from an image of a check are limited. As a result, some checks cannot be processed and are rejected during the mobile deposit process.

Mobile phones that incorporate cameras have also become ubiquitous and may also be useful to capture images of financial documents for mobile processing of financial information through a mobile network connection with a banking institution or business. However, the process of uploading images of financial documents is often prone to user error, as the user is often unaware of whether the document is complete and ready for processing by a business or financial institution. A user with a mobile phone or portable electronic device cannot interact with an employee of the bank in order to determine whether the financial document is ready to be processed.

Therefore, there is a need for the ability to obtain additional information from a digital image of a check which has been captured by a mobile device in order to streamline mobile banking applications and reduce the amount of transaction errors when a document is incomplete.

SUMMARY

Systems and methods for processing an image of a check captured using a mobile device, such as a mobile phone, are provided. These techniques can be implemented on a mobile device and at a central server, and can be used to identify content on a check and determine whether the check is ready to be processed by a business or financial institution. The system can identify portions of the check—such as the endorsement area—to determine if the check has been properly endorsed. If the check lacks an endorsement, a real time notification can be provided to a user which uploaded the check image so the user can correctly endorse the check and upload a new check image. Additional portions of the check, including the signature line, the addressee field, etc. can be checked to ensure that the check is ready to be deposited by the bank.

According to one embodiment, a mobile check image processing system for identifying content in regions of an image of a check captured by a mobile device is provided. The system may comprise a preprocessing unit which receives an image of a check from a mobile device, selects a type of content to be detected on the check image, and identifies at least one region of interest (ROI); a testing unit which performs at least one content detection test on the at least one ROI to detect content of the selected type on the check image; and a feedback unit which receives a result of the at least one content detection test and provides the result to a user. The ROI may correspond to an endorsement region on a back side of the check.

According to another embodiment, a method of identifying content in regions of an image of a check captured by a mobile device is provided. The method may comprise receiving an image of a check from a mobile device; selecting a type of content to be detected on the check image; identifying at least one region of interest (ROI) on the check image; performing at least one content detection test on the at least one ROI to detect content of the selected type on the check image; and providing a result of the at least one content detection test to a user. The ROI may correspond to an endorsement region on a back side of the check.

According to yet another embodiment, a computer-implemented method for processing a mobile-captured image of a check embodied on a computer with a processor and a memory may comprise receiving an image of a check from a mobile device; selecting a type of content to be detected on the check image; identifying at least one region of interest (ROI) on the check image; performing at least one content detection test on the at least one ROI to detect content of the selected type on the check image; and providing a result of the at least one content detection test to a user. The ROI may correspond to an endorsement region on a back side of the check.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

The following detailed description is directed to certain specific embodiments. However, it will be understood that these embodiments are by way of example only and should not be seen as limiting the systems and methods described herein to the specific embodiments, architectures, etc. In this description, reference is made to the drawings wherein like parts are designated with like numerals throughout.

Systems and methods for processing an image of a check captured using a mobile device, such as a mobile phone, are provided. These techniques can be implemented on a mobile device and at a central server, and can be used to identify content on a check and determine whether the check is ready to be processed by a business or financial institution. The system can identify portions of the check—such as the endorsement area—to determine if the check has been properly endorsed. If the check lacks an endorsement, a real time notification can be provided to a user which uploaded the check image so the user can correctly endorse the check and upload a new check image. Additional portions of the check, including the signature line, the addressee field, etc. can be checked to ensure that the check is ready to be deposited by the bank.

Differentiating between characteristics of checks provides additional information to a bank being asked to deposit the check as to the potential risk of the check being fraudulent. The risk of fraudulent checks varies depending on the characteristics of the check, and so a bank can set up various customized rules. If the check has a characteristic that is commonly associated with fraud, the bank may immediately deny the request, or request additional processing of the check image before deciding whether to deposit the check. The user is sent a message if the deposit is denied, and may be provided with instructions to manually deposit the check so that the bank can review the original check.

Content Identification

Figure 1:
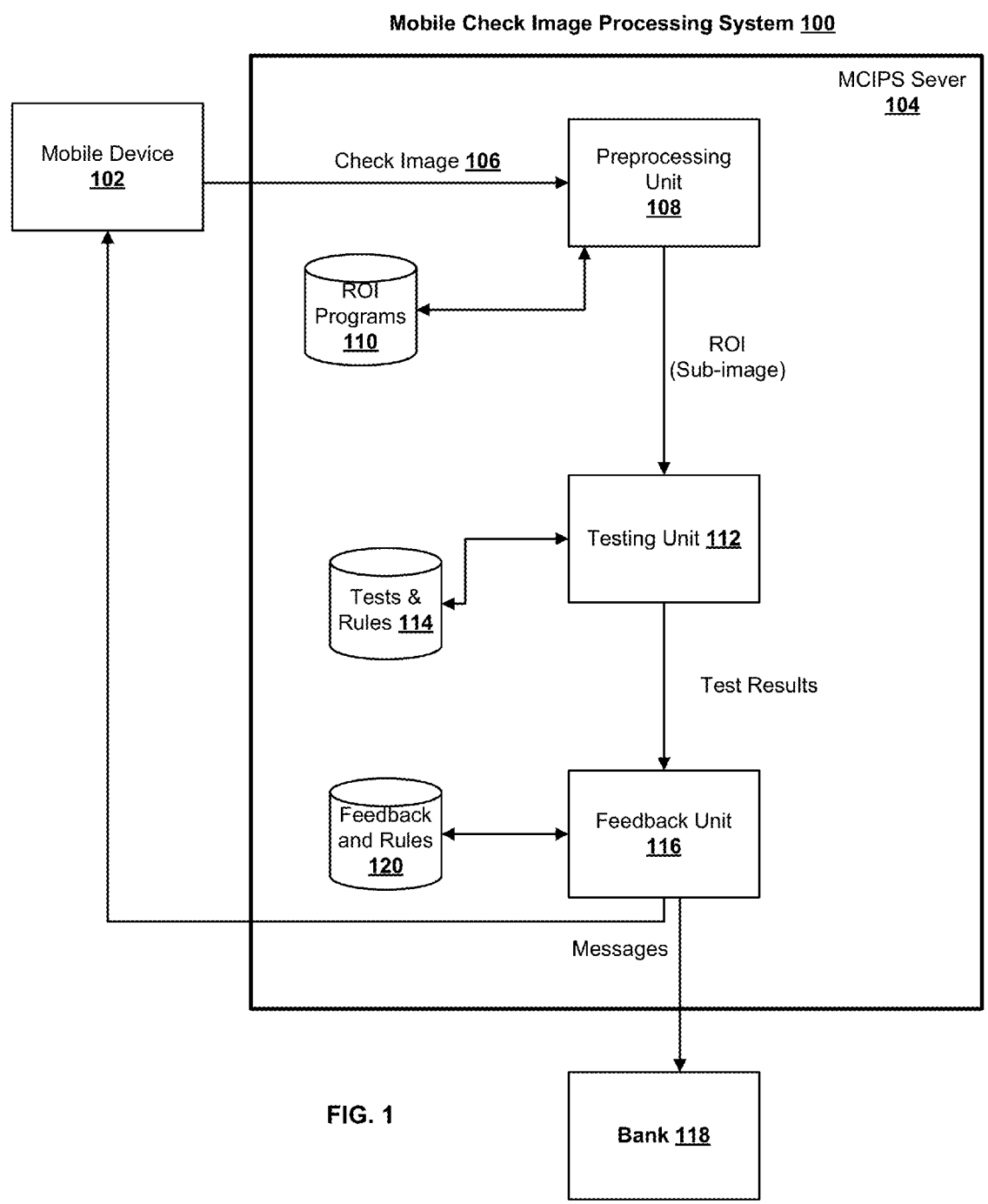
FIG. 1 is a high level block diagram of a system for identifying content in regions of an image of a check captured by a mobile device, according to one exemplary embodiment.

FIG. 1 is a high level block diagram of a system for identifying content in regions of an image of a check captured by a mobile device, according to one exemplary embodiment. A Mobile Check Image Processing System (MCIPS) 100 is shown as a single unit, although one or more of the components of the MCIPS 100 may reside on a mobile device 102 or on an MCIPS server 104 connected with the mobile device through a network (not shown). In the embodiment illustrated in FIG. 1, a user of the mobile device 102 captures an image of a check ("check image") 106 using an image capture device incorporated within the mobile device 102 or connected with the mobile device 102. The check image 106 may include more than one image file, as the user may need to submit an image of a front side of the check and a back side of the check in order for the check to be deposited with a bank. Also, in some cases more than one image may need to be taken of one side of the check in order to clearly capture the content of the check, so the check image 106 will therefore refer to the one or more images of the check which are submitted to the MCIPS 100. The check image 106 is transmitted from the mobile device 102 to a preprocessing unit 108 at the MCIPS server 104, where the check image 106 is processed to select a type of content to be identified and identify at least one region of interest (ROI) where that type of content would be present. The ROI will correspond to a particular area of the check that is known to contain specific content, such as an endorsement, a payor name, a payor address, bank account number, routing number, etc. Programs which execute particular algorithms to identify a specific ROI are stored in an ROI programs database 110 connected with the preprocessing unit 108. The preprocessing unit 108 selects one or more programs to run which identify one or more ROIs on the check image 106 that should contain the specific content needed to perform a mobile deposit process. In the embodiments described herein, the ROI may be an endorsement region on a back side of the check where an endorsement is found.

Once the ROIs are identified, the check image 106 is sent to a testing unit 112 to perform one or more content detection tests on the identified ROIs. In one embodiment, the preprocessing unit may send a sub-image of the check image 106 which contains only the identified ROIs in order to streamline the process by sending only the relevant ROIs that need to be tested. Sending the sub-image would be particularly beneficial if the preprocessing unit is located on the mobile device 102 and the testing unit is located on the MCIPS server 104, as the transmission of only the ROIs across a network would take less time. The testing unit 112 obtains content detection tests from a test and rules database 114 connected with the testing unit 112. The content detection tests are programs that identify specific content in the ROIs, such as an endorsement signature in an endorsement ROI. The content detection tests may identify the presence or absence of particular content or distinguish between one or more types of content in the ROI. For example, an endorsement content detection test may first identify whether an endorsement is present in the endorsement ROI, but will also determine the type of endorsement—such as a hand-written signature or a stamp.

In one embodiment, the content on the check can be manually entered by the user. The check content can be optionally provided by the user at the time that the check is captured. This check content can include various information from the check, such as the check amount, check number, routing information from the face of the check, or other information, or a combination thereof. In some embodiments, a mobile deposition application requests this information from a user of the mobile device, allows the user to capture an image of a check or to select an image of a check that has already been captured, or both, and the mobile deposit information provides the check image, the check content, and other processing parameters to the MCIPS 100.

Once the testing unit performs the appropriate content detection tests, the results of the tests are forwarded to a feedback unit 116 to analyze the results and provide appropriate feedback to the user or to a bank 118. If the endorsement content detection test determines that there is no endorsement on the check, the feedback unit 116 will generate a message to send back to the mobile device 102 telling the user that the endorsement is missing and perhaps requesting that the user endorse the check and upload a new image of the endorsed check. Or, if the endorsement is complete, the feedback unit 116 will generate and send a message to the mobile device 102 indicating that the check is properly endorsed and will be deposited in the user's account. The feedback unit 116 may also generate messages to send to the bank 118 which is receiving the deposited check. For example, the messages may indicate whether the check is ready to be deposited, if a problem has been detected which requires the bank to perform additional processing of the check image, or if the user needs to physically bring the check in.

The feedback unit 116 may generate messages by accessing a feedback message database 120 which stores the messages. The feedback message database 120 may also store rules for generating messages based on the results of the tests performed. In one embodiment, the bank 118 may configure the rules stored in the feedback message database 120 so that certain messages are sent to the bank or the user depending on the results of the tests performed.

The feedback unit 116 may also be configured to take a particular action that coincides with the message that is being delivered to the user or the bank. If an endorsement is not present on the check, the feedback unit 116 may also suspend the mobile deposit process and await a new check image from the user. Once the revised check image is received and the testing unit 112 returns a positive test confirming the presence of an endorsement, the feedback unit 116 reactivates the mobile deposit process and sends a message to the bank 118 that the check is ready to be deposited.

In certain embodiments, the mobile application can display information on the mobile device shortly after the user takes the mobile document image to allow the user to retake the image if the image is found to have defects that affect the overall status of the image. In some embodiments, where the MCIPS 100 is implemented at least in part on the mobile device, the MCIPS 100 can include a user interface module that is configured to display the test results message on a screen of the mobile device 102.

FIG. 1 merely provides a description of the logical components of the MCIPS 100. In some embodiments, the MCIPS 100 can be implemented on the mobile device, in software, hardware, or a combination thereof. In other embodiments, the MCIPS 100 can be implemented on a remote server (not shown), and the mobile device can send the check image 106 e.g., via a wireless interface, to the remote server for processing. The remote server sends the test results and test messages to the mobile device 102 to indicate whether the mobile image passed testing. In some embodiments, part of the functionality of the MCIPS 100 can be implemented on the mobile device 102 while other parts of the MCIPS 100 are implemented on the remote server. The MCIPS 100 can be implemented in software, hardware, or a combination thereof. In still other embodiments, the MCIPS 100 can be implemented entirely on the remote server, and can be implemented using appropriate software, hardware, or a combination thereof.

Figure 2:
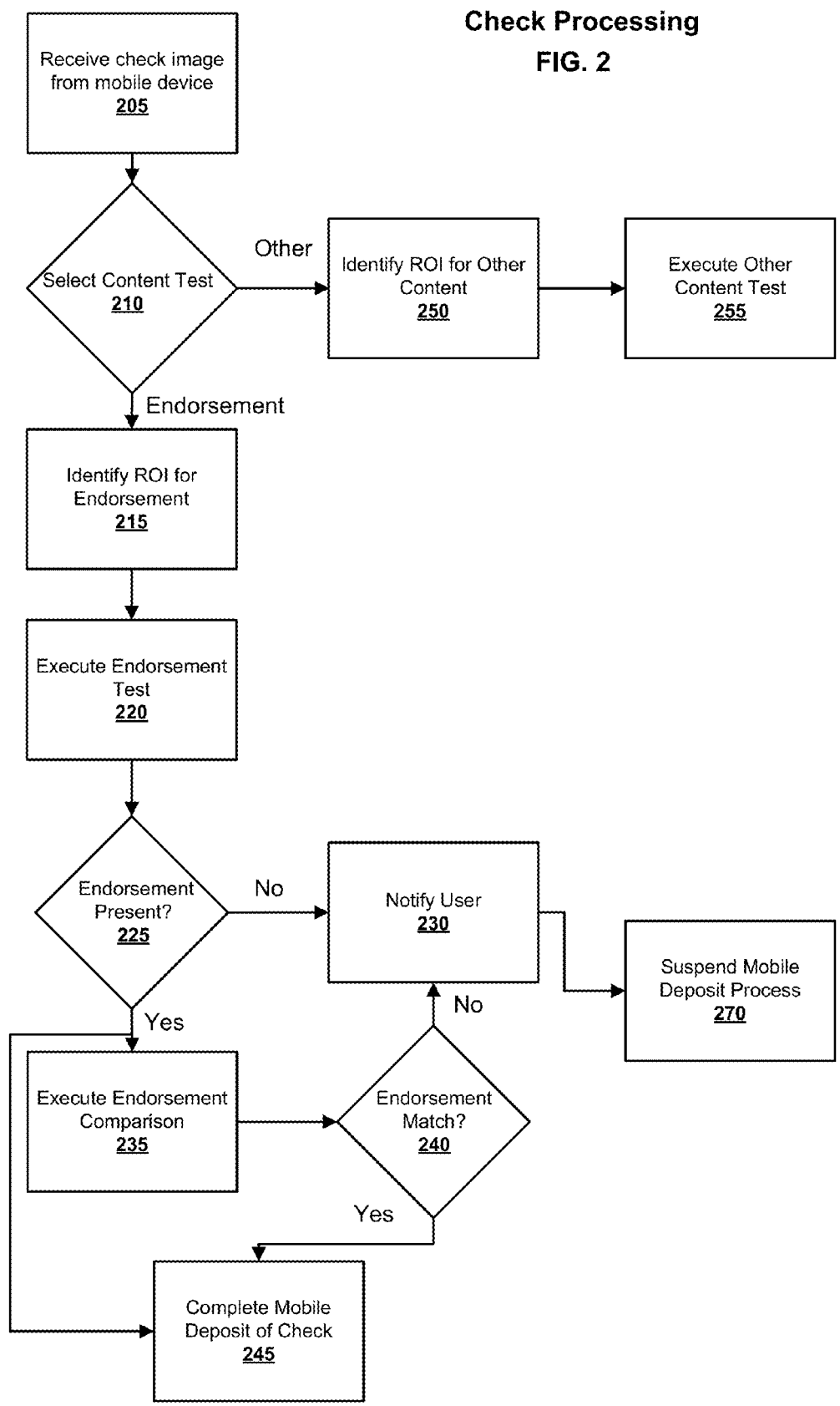
FIG. 2 is a flow diagram of a method for identifying content in regions of an image of a check captured by a mobile device, according to one exemplary embodiment.

FIG. 2 is a flow diagram of a method for identifying content in at least one region of an image of a check captured by a mobile device, according to one exemplary embodiment. In step 205, the check image is received from the mobile device. In step 210, the type of content to be identified is selected—either a test to check for an endorsement or a test to determine other content. In one embodiment, both tests can be selected and run either simultaneously or in sequence.

If the endorsement test is selected ("Endorsement"), the next step is step 215 to identify a region of interest (ROI) where the endorsement would be present on the check. In many situations, the ROI is on the back of the check in an endorsement area (see FIG. 3). Next, in step 220, a content detection test is run on the selected ROI to determine if an endorsement is present. In step 225, the results of the test of whether the endorsement is present are used to determine the next step. If the endorsement is not present, then, in step 230, the user is notified that the check they are attempting to deposit has not been endorsed. This notification may also include instructions to correct the error. Once the user is notified, the mobile deposit process may be suspended (step 270) until another image is submitted. If the endorsement is present in the ROI, an endorsement comparison test may be executed at step 235, where the identified endorsement is compared with either a signature or stamp stored on the MCIPS server, or where the signature or stamp is compared with the name listed in a payee field (see FIG. 4) on a front area of the check to determine if the person or entity endorsing the check is the same person that the check is addressed to. In step 240, if the endorsement does not match the stored endorsement or the payee field, the user is notified (step 230) and the mobile deposit process may be suspended (step 270). If the endorsement does match the payee field name or the stored endorsement signature or stamp, the mobile deposit process may be completed in step 245.

If the "Other Type" test is selected at step 210, a region of interest (ROI) on the check image is identified in step 250 where the other type content would be indicated. In step 255, a content detection test is run on the identified ROI to determine characteristics of the other type. Once the characteristics of the other type have been identified, the characteristics are evaluated in step 260 based on processing rules established for the other type. For example, the processing rule could check for a proper signature by a payer.

Figure 3:
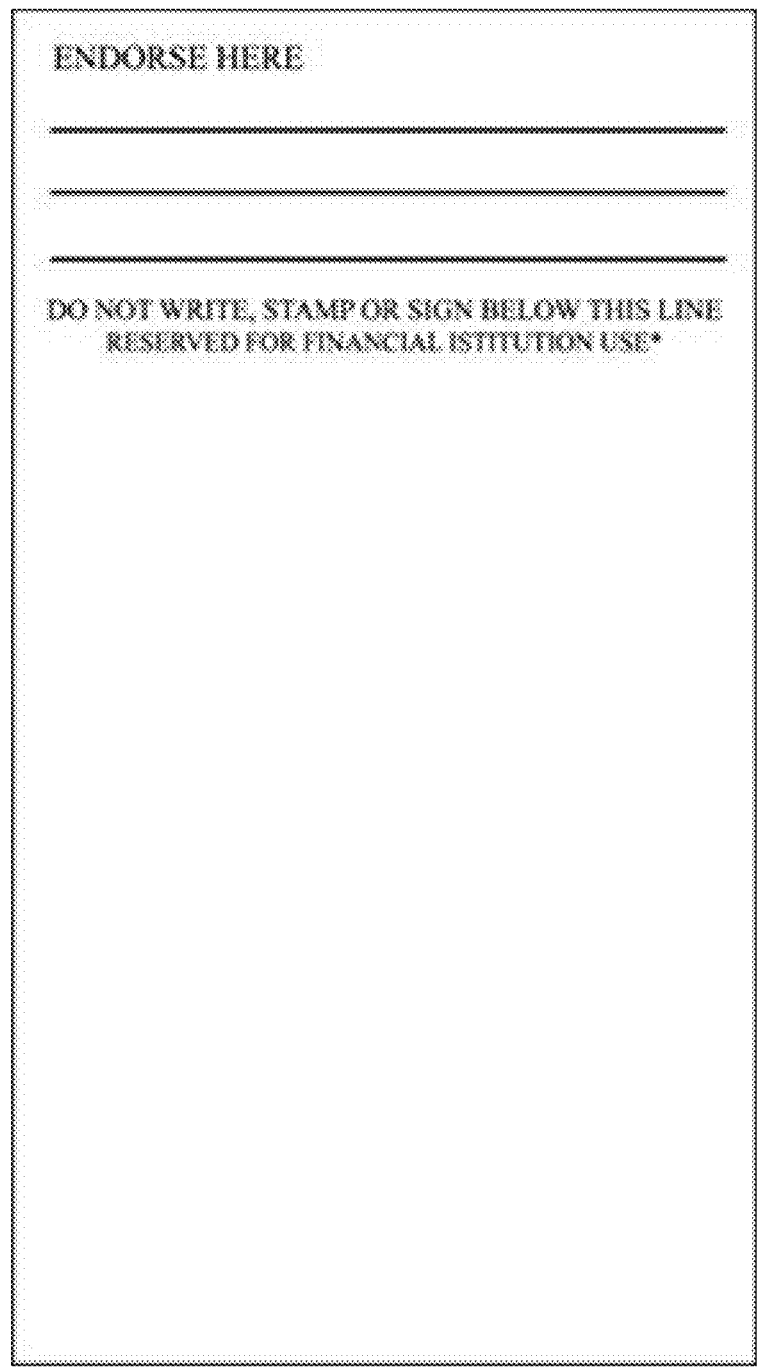
FIG. 3 is an image of a back side of a check depicting an endorsement region where an endorsement should be present, according to one exemplary embodiment.

FIG. 3 is an image of a back side 300 of a check, depicting an endorsement region 302 where an endorsement should be present, according to one exemplary embodiment.

Figure 4:
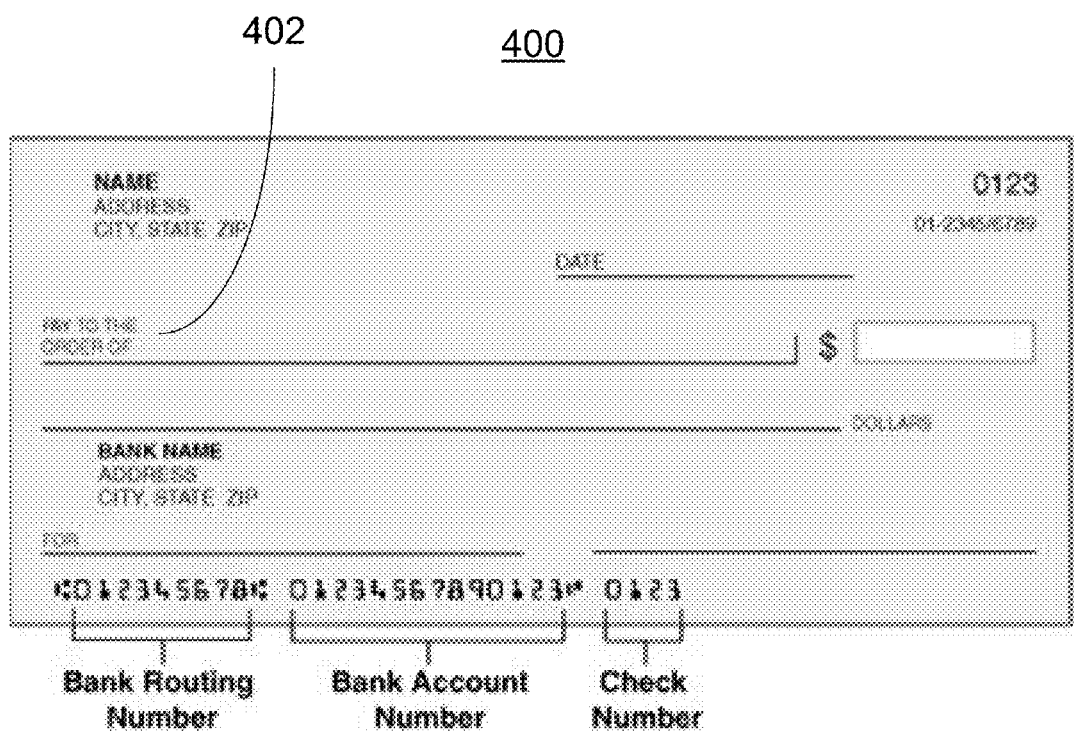
FIG. 4 is an image of a front side of a check depicting a payee field which can be compared with an endorsement to determine the authenticity of the endorsement, according to one exemplary embodiment.

FIG. 4 is an image of a front side 400 of a check, depicting a payee field 402 which can be used to compare with the identified endorsement in order to determine if the endorsement and the payee fields match.

According to some embodiments, the systems and methods for identifying content of a check can be integrated with one or more mobile applications that process mobile document images, such as mobile deposit applications for processing images of checks to be deposited into a bank account. According to an embodiment, the mobile application can run on the mobile device and can be integrated to use mobile image quality assurance functionality that is implemented on the mobile device and/or on a remote server. The mobile application can use the system for identifying content of a check to streamline the mobile deposit process.

MICR-Line Test

In one embodiment, an image of a check can be rejected if the MICR-line on the check cannot be clearly detected in the image. MICR stands for Magnetic Ink Character Recognition. Information can be printed on the front of a check in a special typeface using a special magnetized ink. Therefore, the MICR-line test is useful to determine which side of the check is in a check image before a region of interest (ROI) is selected. A MICR IQA test can use optical character recognition techniques to identify the MICR information on a check. If the MICR line on the front of the check is damaged, simply retaking an image of the check will not correct the defects in the image and the image will be rejected; however, if the MICR line was merely blurry or unreadable due to one or more of the factors described above, retaking the image after correcting one or more of factors may result in a high-enough quality image that the MICR line can be read from the check.

Figure 5:
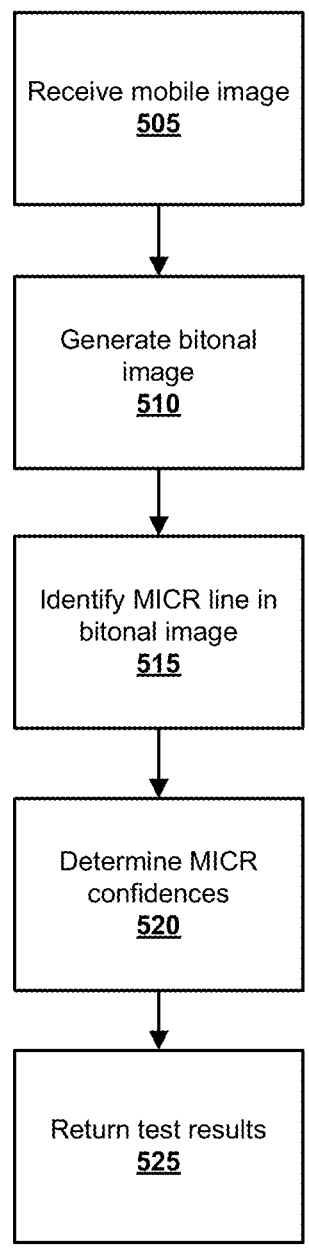
FIG. 5 is a method for testing the quality of a MICR (Magnetic Ink Character Recognition) line of the check image, according to an embodiment.

FIG. 5 illustrates a method for testing the quality of a MICR (Magnetic Ink Character Recognition) line of the check image, according to an embodiment. The MICR-line Test is used to determine whether a high quality image of a check front has been captured using the mobile device according to an embodiment. The MICR-line Test can be used in conjunction with a Mobile Deposit application to ensure that images of checks captures for processing with the Mobile Deposit information are of a high enough quality to be processed so that the check can be electronically deposited. Furthermore, if a mobile image fails the MICR-line Test, the failure may be indicative of incorrect subimage detections and/or poor overall quality of the mobile image, and such an image should be rejected anyway.

FIG. 5 is a flow chart of a method for executing a MICR-line Test according to an embodiment. A mobile image is received (step 505) and a bitonal image is generated from the mobile image (step 510). In an embodiment, preprocessing unit 108 extracts the document subimage from the check image as described above, including preprocessing such as geometric correction. The extracted subimage can then be converted to a bitonal snippet by the preprocessing unit 108. The MICR line is then identified in the bitonal snippet (step 515). According to an embodiment, a MICR recognition engine is then applied to identify the MICR-line and to compute character-level and overall confidence values for the image (step 520). These confidences can then be normalized to the 0-1000 scale used by the mobile IQA tests where 1000 means high quality and 0 means poor MICR quality. The confidence level is then returned (step 525). As described above, the test result value is provided to the testing unit 112 where the test result value can be compared to a threshold value associated with the test. If the test result value falls below the threshold associated with the test, detailed test result messages can be retrieved from the feedback and rules database 120 and provided to the user via the feedback unit 116 to indicate why the test failed and what might be done to remedy the test. For example, the user may simply need to retake the image to adjust for geometrical or other factors, such as poor lighting or a shadowed document. In some instances, the user may not be able to correct the errors. For example, if the MICR line on the document is damaged or incomplete and the document will continue to fail the test even if the image were retaken.

Front-as-Rear Test

Figure 6:
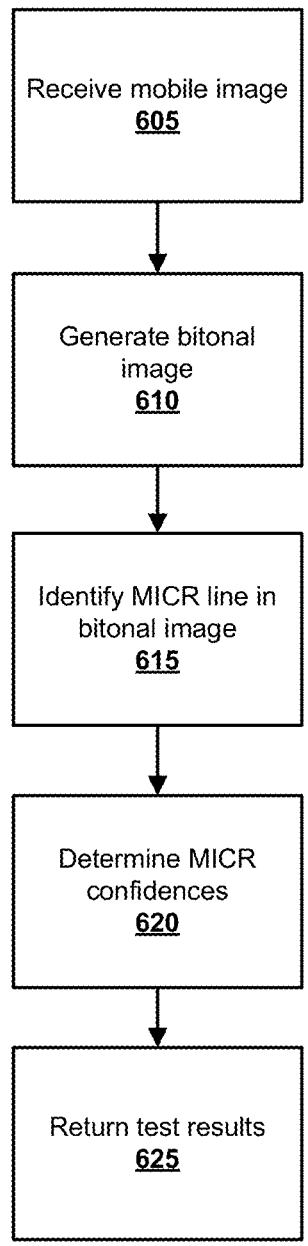
FIG. 6 is a method for testing the aspect ratios of front and back images of a check to test whether the images are of the same check, according to an embodiment.

FIG. 6 is a method for testing the aspect ratios of front and back images of a check to test whether the images are of the same check, according to an embodiment. A Front-as-Rear Test can be used to determine whether an image that is purported to be the back of a check is actually an image of the front of the check according to an embodiment. The Front-as-Rear Test is a check specific Boolean test. The test returns a value of 0 if an image fails the test and a value of 1000 if an image passes the test. If an MICR-line is identified on what is purported to be an image of the back of the check, the image will fail the test and generate a test message that indicates that the images of the check have been rejected because an image of the front of the check was mistakenly passed as an image of the rear of the check.

An image of the rear of the check is received (step 605) and the image is converted to a bitonal snippet by preprocessing unit 108 of the MCIPS 100 (step 610). A MICR recognition engine is then applied to identify a MICR-line in the bitonal snippet (step 615). The results from the MICR recognition engine can then be normalized to the 0-1000 scale used by the mobile IQA tests, and the normalized value compared to a threshold value associated with the test (step 620). According to an embodiment, the test threshold can be provided as a parameter to the test along with the with mobile document image to be tested. According to an embodiment, the threshold used for this test is lower than the threshold used in the MICR-line Test described above.

If the normalized test result equals or exceeds the threshold, then the image includes an MICR-line and the test is marked as failed (test result value=0), because a MICR line was identified in what was purported to be an image of the back of the check. If the normalized test result is less than the threshold, the image did not include a MICR line and the test is marked as passed (test result value=1000). The test results value is then returned (step 625).

Computer-Implemented Embodiment

Figure 7:
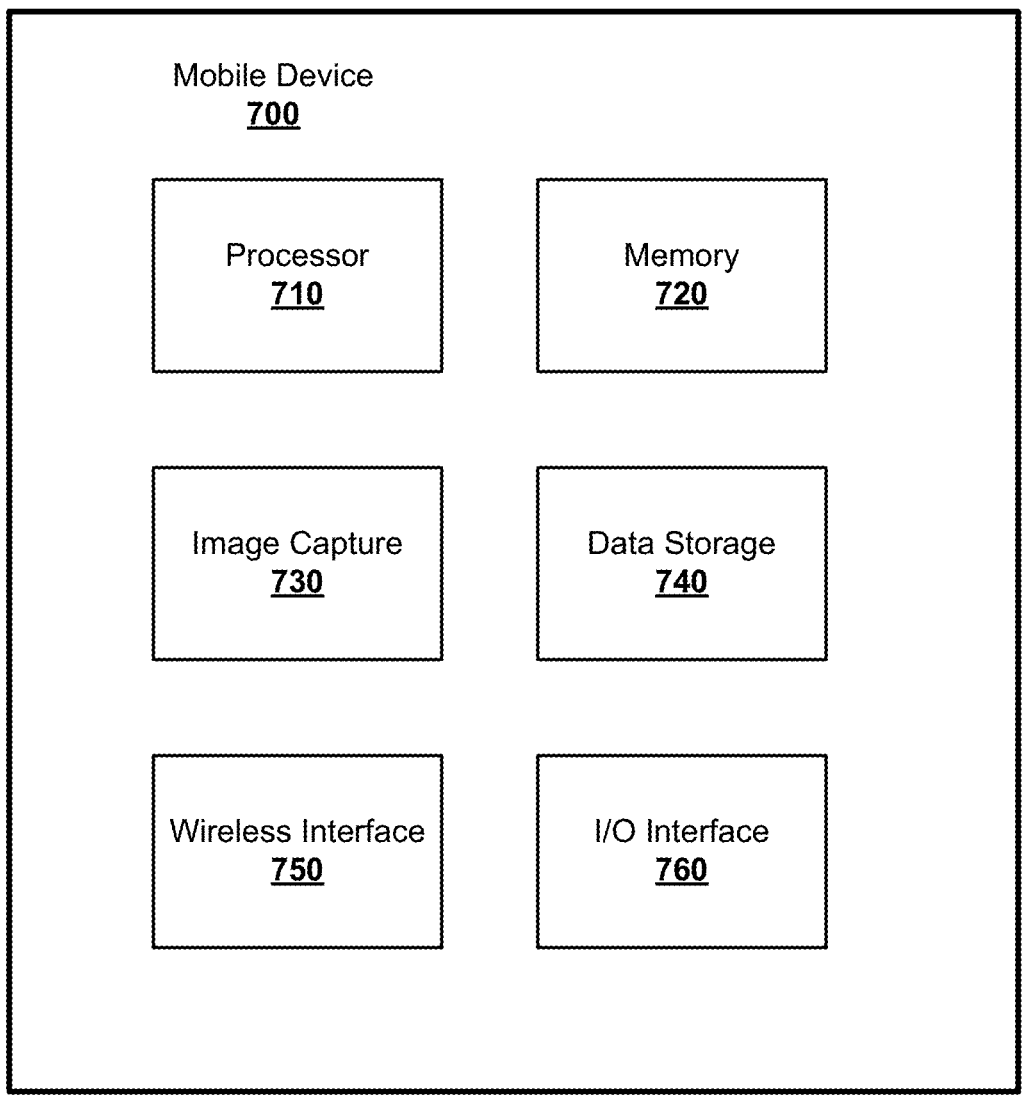
FIG. 7 is a block diagram of a computing device on which the mobile image quality assurance system described above can be implemented, according to an embodiment.

FIG. 7 is an exemplary embodiment of a mobile device 700 than can be used to implement the mobile IQA system according to an embodiment. Mobile device 700 includes a processor 710. The processor 710 can be a microprocessor or the like that is configurable to execute program instructions stored in the memory 720 and/or the data storage 740. The memory 720 is a computer-readable memory that can be used to store data and or computer program instructions that can be executed by the processor 710. According to an embodiment, the memory 720 can comprise volatile memory, such as RAM and/or persistent memory, such as flash memory. The data storage 740 is a computer readable storage medium that can be used to store data and or computer program instructions. The data storage 740 can be a hard drive, flash memory, a SD card, and/or other types of data storage.

The mobile device 700 also includes an image capture component 730, such as a digital camera. According to some embodiments, the mobile device 700 is a mobile phone, a smart phone, or a PDA, and the image capture component 730 is an integrated digital camera that can include various features, such as auto-focus and/or optical and/or digital zoom. In an embodiment, the image capture component 730 can capture image data and store the data in memory 720 and/or data storage 740 of the mobile device 700.

Wireless interface 750 of the mobile device can be used to send and/or receive data across a wireless network. For example, the wireless network can be a wireless LAN, a mobile phone carrier's network, and/or other types of wireless network.

I/O interface 760 can also be included in the mobile device to allow the mobile device to exchange data with peripherals such as a personal computer system. For example, the mobile device might include a USB interface that allows the mobile to be connected to USB port of a personal computer system in order to transfers information such as contact information to and from the mobile device and/or to transfer image data captured by the image capture component 730 to the personal computer system.

Those of skill in the art will appreciate that the various illustrative modules, components, engines, and method steps described in connection with the above described figures and the embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules, components, modules, engines, and method steps described in connection with the embodiments disclosed herein can be implemented or performed with hardware such as a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor is hardware and can be a microprocessor, but in the alternative, the processor can be any hardware processor or controller, microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm and the functionality of a component, engine, or module described in connection with the embodiments disclosed herein can be embodied directly in hardware, in software executed by a processor, or in a combination of the two. Software can reside in computer or controller accessible computer-readable storage media including RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A mobile check image processing system, comprising:
   a preprocessing unit which is configured to:
      receive an image purported to be one side of a check from a mobile device;
      activate one or more inspections of the check image, wherein a first inspection is to determine whether the received image is actually an image of the other side of the check; and
      subsequent to the first inspection, activate a second inspection to:
         select a type of content to be detected on the check image;
         identify a plurality of regions of interests (ROIs) on the check image that are known to contain the selected type of content; and
         transmit a sub-image of the image of the check which contains only the identified plurality of ROIs to a testing unit;
   the testing unit which is configured to:
      receive the sub-image of the check image from the preprocessing unit; and
      perform at least one content detection test on the sub-image which contains the identified plurality of ROIs to detect the selected type of content on the check image; and
   a feedback unit which is configured to:
      receive a result of the at least one content detection test; and
      based on the result, generate a message to notify a user of the mobile device when the selected type of content is not present.

2. The system of claim 1, wherein at least one ROI of the plurality of ROIs corresponds to an endorsement region on a back side of the check.

3. The system of claim 2, wherein the selected type of content is an endorsement.

4. The system of claim 3, wherein the feedback unit notifies the user in real time if the endorsement is not present.

5. The system of claim 3, wherein the content detection test determines whether the endorsement is a signed endorsement or a stamped endorsement.

6. The system of claim 5, wherein the testing unit compares a signed endorsement with a signature stored in a database to determine the authenticity of the signed endorsement.

7. The system of claim 5, wherein the testing unit compares a stamped endorsement with a stamp stored in a database to determine the authenticity of the stamped endorsement.

8. The system of claim 5, wherein the testing unit compares a stamped endorsement with a payee region on a front side of the check to verify the identity of the endorsement.

9. A method of processing a mobile-captured image of a check, comprising:
   receiving an image purported to be one side of a check from a mobile device;
   activate one or more inspections of the check image, wherein a first inspection comprising determining whether the received image is actually an image of the other side of the check; and
   subsequent to the first inspection, activate a second inspection comprising:
      selecting a type of content to be detected on the check image;
      identifying a plurality of regions of interests (ROIs) on the check image that are known to contain the selected type of content;
      transmitting a sub-image which contains only the identified plurality of ROIs;
      performing at least one content detection test on the identified plurality of ROIs to detect the selected type of content on the check image; and
      providing, based on a result of the at least one content detection test, a real-time notification to a user of the mobile device when the selected type of content is not present.

10. The method of claim 9, wherein at least one ROI of the plurality of ROIs corresponds to an endorsement region on a back side of the check.

11. The method of claim 10, wherein the selected type of content is an endorsement.

12. The method of claim 11, further comprising notifying the user in real time if the endorsement is not present.

13. The method of claim 11, wherein the content detection test determines whether the endorsement is a signed endorsement or a stamped endorsement.

14. The method of claim 13, further comprising comparing a signed endorsement with a signature stored in a database to determine the authenticity of the signed endorsement.

15. The method of claim 13, further comprising comparing a stamped endorsement with a stamp stored in a database to determine the authenticity of the stamped endorsement.

16. The method of claim 13, further comprising comparing a stamped endorsement with a payee region on a front side of the check to verify the identity of the endorsement.

17. A computer-implemented method for processing a mobile-captured image of a check, the computer-implemented method embodied on a computer with a processor and a memory, and comprising:
  receiving an image purported to be one side of a check from a mobile device at a preprocessing unit;
  preprocessing, using the preprocessing unit by the processor, the image of the check by:
    activating one or more inspections of the check image, wherein a first inspection comprising determining whether the received image is actually an image of the other side of the check; and
    subsequent to the first inspection, activate a second inspection comprising:
      selecting a type of content to be detected on the check image;
      identifying a plurality of regions of interests (ROIs) on the check image that are known to contain the selected type of content;
      transmitting a sub-image of the image of the check which contains only the identified plurality of ROIs to a testing unit;
      receiving the sub-image of the image of the check at a testing unit;
      performing, using the testing unit by the processor, at least one content detection test on the sub-image which contains the identified plurality of ROIs to detect the selected type of content on the check image; and
      providing, based on a result of the at least one content detection test, a real-time notification to a user of the mobile device when the selected type of content is not present.

18. The computer-implemented method of claim 17, wherein the selected type of content is an endorsement.

19. The method of claim 18, further comprising notifying the user in real time if the endorsement is not present.

20. The system of claim 1, wherein the one side of the check is the back-side of the check and the other side of the check is the front-side of the check.

21. The system of claim 20, wherein determining whether the image is actually an image of the front-side of a check includes determining if a Magnetic Ink Character Recognition (MICR)-line is identified on the received image.

22. The method of claim 9, wherein the one side of the check is the hack-side of the check and the other side of the check is the front-side of the check.

23. The method of claim 22, wherein determining whether the image is actually an image of the front-side of a check includes determining if a MICR-line is identified on the received image.

* * * * *